(12) United States Patent
Britton et al.

(10) Patent No.: US 11,772,598 B1
(45) Date of Patent: Oct. 3, 2023

(54) CAR SEAT SAFETY HARNESS RETAINING DEVICE

(71) Applicants: Elise Britton, Calgary (CA); Robyn Adams, Calgary (CA)

(72) Inventors: Elise Britton, Calgary (CA); Robyn Adams, Calgary (CA)

(*) Notice: Subject to any disclaimer, the term of this patent is extended or adjusted under 35 U.S.C. 154(b) by 0 days.

(21) Appl. No.: 17/934,586

(22) Filed: Sep. 23, 2022

(51) Int. Cl.
*B60R 22/02* (2006.01)
*B60R 22/30* (2006.01)
*B60R 22/26* (2006.01)

(52) U.S. Cl.
CPC .......... *B60R 22/024* (2013.01); *B60R 22/26* (2013.01); *B60R 22/30* (2013.01)

(58) Field of Classification Search
CPC ....... B60R 22/024; B60R 22/30; B60R 22/26; B60R 22/24; B60R 22/10; B60R 22/12; B60R 21/02; B60N 2/28; B60N 2/26; B60N 2/24
USPC ............... 280/808, 801.1; 297/250.1, 219.12
See application file for complete search history.

(56) References Cited

U.S. PATENT DOCUMENTS

| | | | | |
|---|---|---|---|---|
| 1,380,177 A * | 5/1921 | Arkin | .................. | A44B 17/0011 24/657 |
| 2,601,424 A | 6/1952 | Baker | | |
| 3,114,274 A | 12/1963 | Holst | | |
| 3,144,274 A * | 8/1964 | Harris | ..................... | B60R 22/02 24/303 |
| 5,282,616 A | 2/1994 | Stacavich-Notaro | | |
| 7,373,696 B2 * | 5/2008 | Schoening | ........... | A41D 25/003 24/66.1 |
| 8,240,772 B2 | 8/2012 | Kawata et al. | | |
| 8,465,102 B2 | 6/2013 | Morrissey | | |
| 8,608,246 B1 * | 12/2013 | Teague | .................. | B60N 2/2812 297/484 |
| 8,672,413 B2 | 3/2014 | Morrissey | | |
| 9,049,894 B2 | 6/2015 | Wong | | |
| 9,399,417 B1 | 7/2016 | Grey et al. | | |
| 9,643,765 B2 | 5/2017 | Pivonka | | |
| 10,124,702 B2 * | 11/2018 | Denbo | .................. | B60N 2/2812 |
| 10,512,292 B2 | 12/2019 | Curtis | | |
| 10,589,712 B2 | 3/2020 | Kang et al. | | |
| 10,793,103 B2 | 10/2020 | Kukielka et al. | | |
| 2005/0179289 A1 * | 8/2005 | Fuller | .................. | B60N 2/2845 297/250.1 |
| 2006/0216126 A1 * | 9/2006 | Mechling | ................. | A61G 5/10 410/7 |
| 2011/0133528 A1 | 6/2011 | Keith et al. | | |
| 2013/0015691 A1 | 1/2013 | Feng et al. | | |

(Continued)

*Primary Examiner* — Paul N Dickson
*Assistant Examiner* — Caitlin Anne Miller
(74) *Attorney, Agent, or Firm* — Lewellyn Law, PLLC; Stephen Lewellyn

(57) ABSTRACT

A safety harness retaining device for a child seat has first and second parts. The first part has a body, a cover removably attached to the body to cover a first side of the body, a magnet enclosed by the cover and body, a pin attached to and extending from a second side of the body for piercing a covering of the child seat, and a clasp removably connectable to the pin for securing the first part to the covering. The second part has a strap configured to be wrapped around and secured to a safety harness belt of the child seat and has an encased ferrous material. And the first part and the second parts are removably connectable through a magnetic force between the magnet and the ferrous material.

3 Claims, 4 Drawing Sheets

(56) References Cited

U.S. PATENT DOCUMENTS

| | | | |
|---|---|---|---|
| 2013/0285424 A1* | 10/2013 | Gardner | B60N 2/2812 297/250.1 |
| 2014/0082894 A1* | 3/2014 | Walker | B60N 2/2803 24/303 |
| 2015/0201712 A1 | 7/2015 | Keller | |
| 2015/0306988 A1* | 10/2015 | Pivonka | B60N 2/2812 24/301 |
| 2021/0177075 A1 | 6/2021 | Hall | |

\* cited by examiner

CAR SEAT SAFETY HARNESS RETAINING DEVICE

FIELD OF THE INVENTION

The present invention relates generally to a safety harness retaining device, and more particularly, to a magnetized safety harness retaining device for use with a child car seat.

BACKGROUND OF THE INVENTION

Child car seats use safety harnesses for securing a child in the seat. Often the safety harness is a five-point harness having two shoulder straps that are each engaged with a strap buckle located between the child's legs. When not in use, the shoulder straps and strap buckle typically lie in the middle of the car seat where a child would be seated. Thus, when placing a child in the seat, the child is typically placed on top of the shoulder straps and/or strap buckle, which then need to be retrieved from underneath the child. The retrieval can be uncomfortable for the child and difficult for the user.

Safety harness-holding devices that are aimed at solving this problem exist. Generally, the existing devices operate to hold the safety harnesses or belts in a spread open position allowing a child to be placed in the seat without being seated on the belts. However, the existing devices include numerous components and are cumbersome to operate or are designed for use with car seats having metal buckles. Accordingly, there remains a need and desire for a safety harness retaining device for car seats that is simple to operate and can be used with seats that do not have metal buckles.

SUMMARY OF THE INVENTION

Embodiments of the invention provide a safety harness retaining device of simple construction that is used for holding the safety belts of a car seat to allow seating of a child in the seat without being seated on the safety belts.

In one aspect, the safety harness retaining device includes two parts. One part is secured to the child seat and the second part is secured to a safety belt. The two parts are configured to be removably connected by simply pulling the safety belt in a direction away from the first part. In aspects, the two parts are removably connected by a magnetic force.

In aspects, the first part includes a pin and a clasp that is removably attachable to the pin, and wherein the pin and clasp facilitates attaching the first part to a cover of the child seat. In further aspects, at least one of the first part or the second part has a magnet that operates to removably connect the first and second parts. In yet a further aspect, the second part includes a strap that is configured to wrap around the safety harness belt.

In one aspect, a safety harness retaining device for a child seat has first and second parts. The first part has a body, a cover removably attached to the body to cover a first side of the body, a magnet enclosed by the cover and body, a pin attached to and extending from a second side of the body for piercing a covering of the child seat, and a clasp removably connectable to the pin for securing the first part to the covering. The second part has a strap configured to be wrapped around and secured to a safety harness belt of the child seat and has an encased ferrous material. And the first part and the second parts are removably connectable through a magnetic force between the magnet and the ferrous material.

Numerous objects, features, and advantages of the present invention will be readily apparent to those of ordinary skill in the art upon a reading of the following detailed description of presently preferred, but illustrative, embodiments of the present invention when taken in conjunction with the accompanying drawings. The invention is capable of other embodiments and of being practiced and carried out in various ways. Also, it is to be understood that the phraseology and terminology employed herein are for descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide a further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

The devices discussed herein are illustrative examples to make and use this invention and are not to be interpreted as limiting in scope unless stated otherwise. While the devices have been described with a degree of particularity, it is to be noted that many modifications may be made in the details of the construction and the arrangement of the devices and components without departing from the spirit and scope of this disclosure.

With reference to FIGS. 1 through 7 of the drawings, reference number 10 generally designates a safety harness retaining device that is constructed in accordance with an embodiment of the invention. Device 10 is configured to be used with a child seat 12, generically represented in FIG. 1, to hold the safety belts of the child seat in a generally open position to allow placing a child in the seat without being seated upon the belts. It is important to note that while device 10 is shown in use in connection with a vehicle child seat 12, the device could be used with a child carrier, stroller, wheelchair, and similar articles wherein an individual, child or adult, is secured by safety belts or a safety harness.

Figure 1:
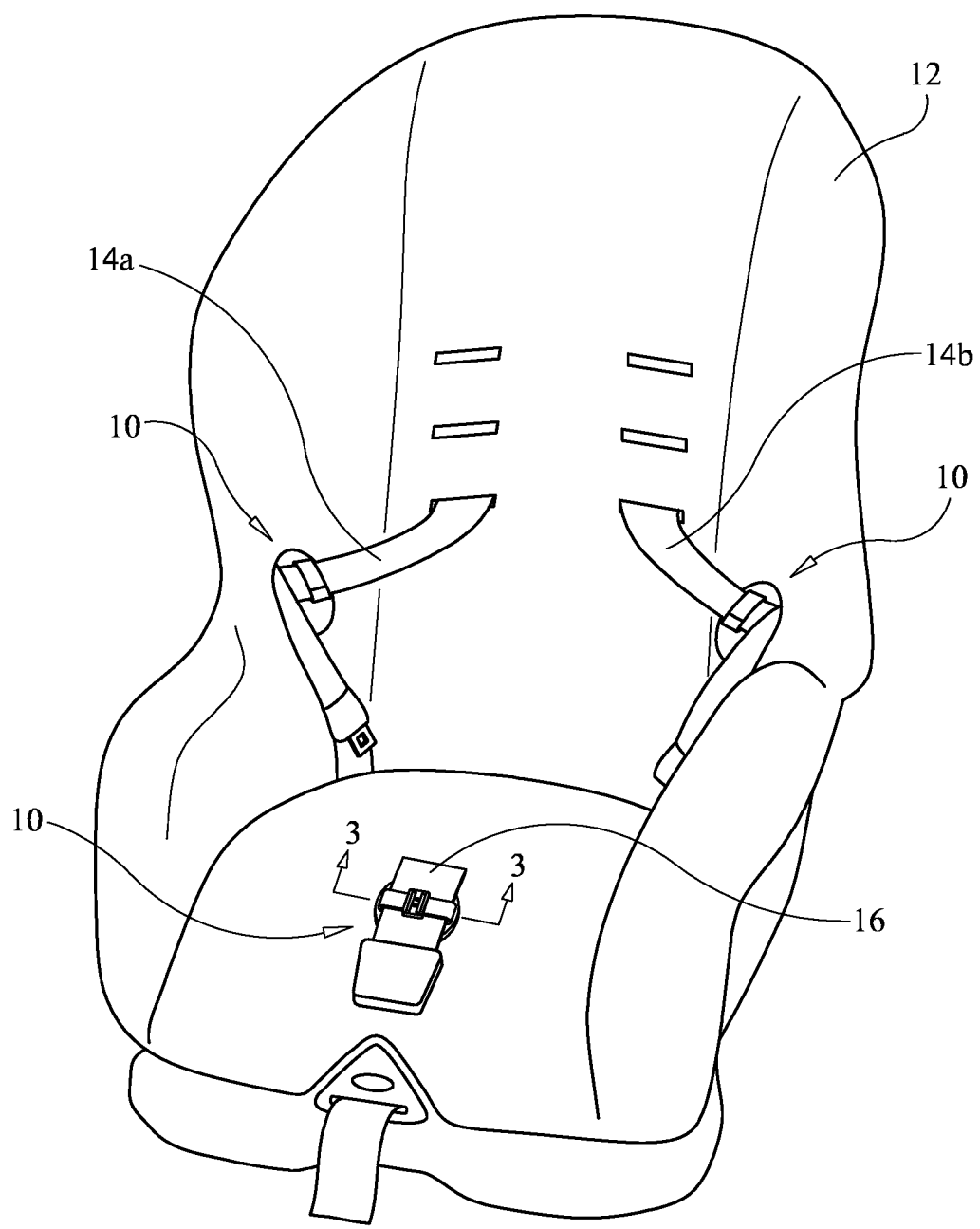
FIG. 1 is a diagrammatic perspective view showing a generically represented car seat in use in connection with multiple safety harness retaining devices in accordance with embodiments of the invention.
Figure 2:
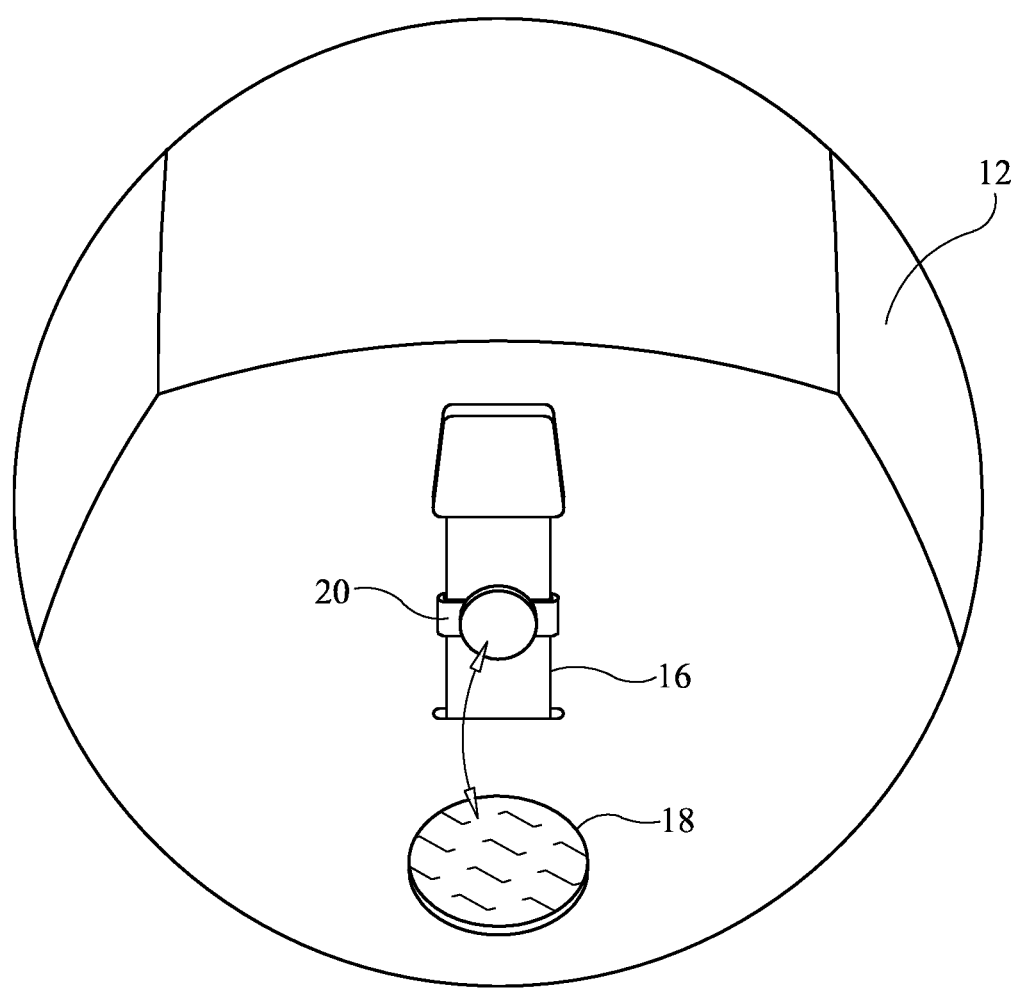
FIG. 2 is a diagrammatic perspective view showing a safety harness retaining device in use in connection with a seat safety belt.
Figure 3:
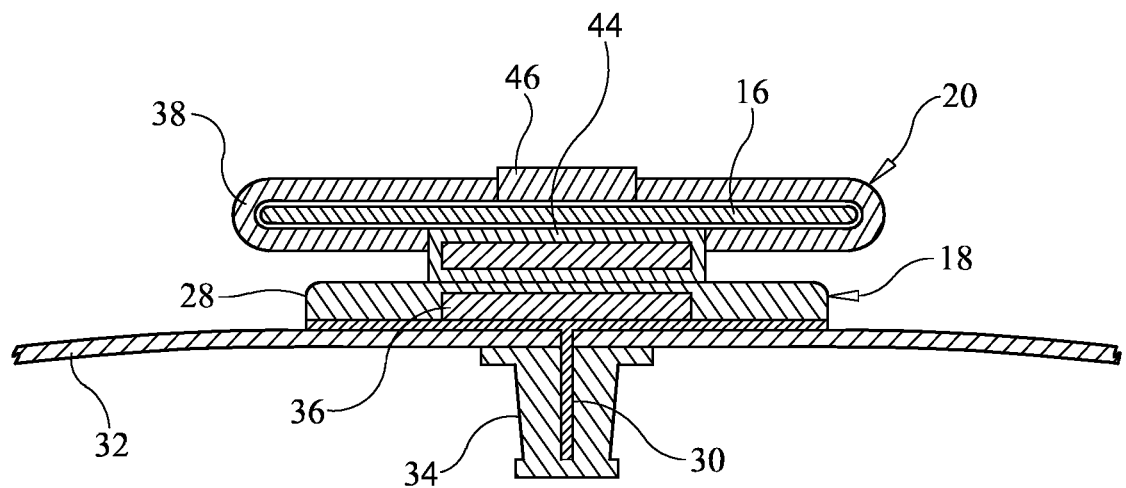
FIG. 3 is a cross-sectional view taken along line 3-3 in FIG. 1.
Figure 4:
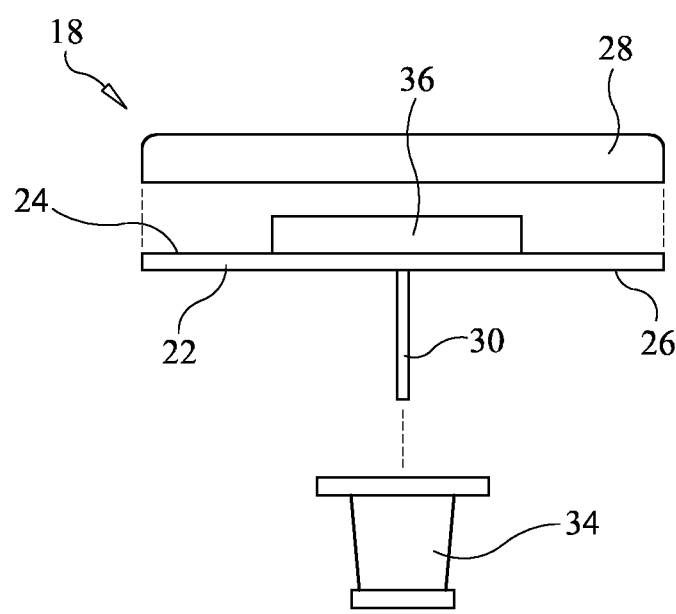
FIG. 4 is an exploded, side view of a first part of a safety harness retaining device, in accordance with embodiments of the invention.
Figure 5:
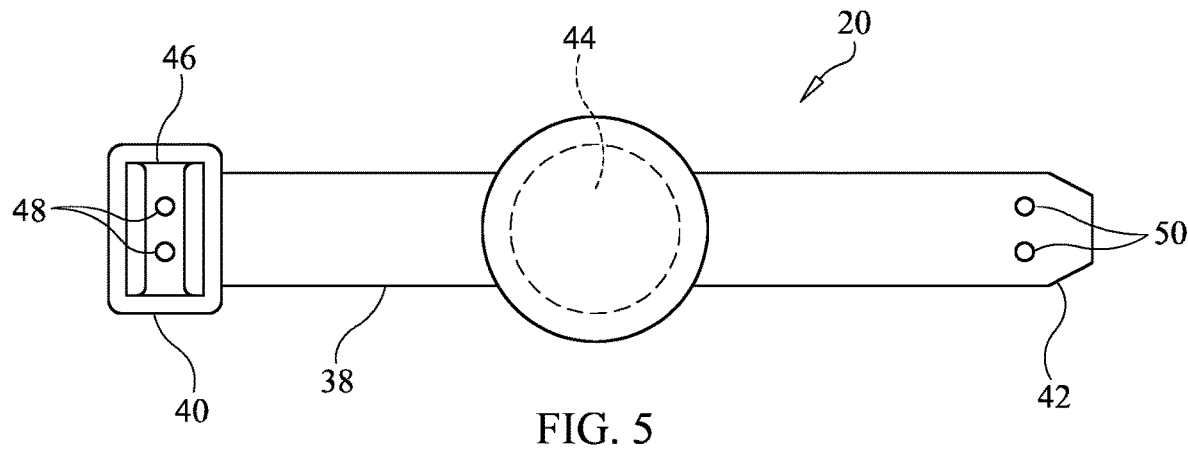
FIG. 5 is a top view of a second part of a safety harness retaining device, in accordance with embodiments of the invention.
Figure 6:
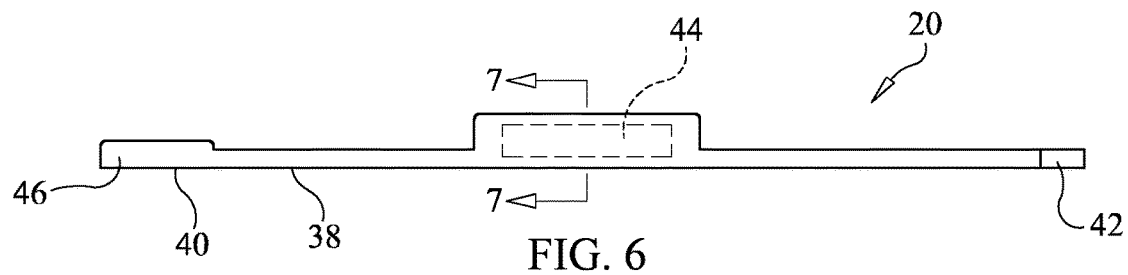
FIG. 6 is a side view of the second part.
Figure 7:
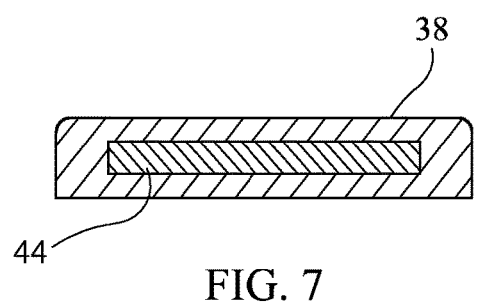
FIG. 7 is cross-sectional view taken along line 7-7 in FIG. 6.

As shown in FIG. 1, several devices 10 can be used with the child seat 12 to hold the various belts, representatively shown as shoulder belts 14a and 14b and center belt 16, which together form a five-point harness for securing the child in the seat. Operating the belts to secure a child in the seat is well known and a description of such operation is not required for an understanding of this disclosure.

With continued reference to the Figures of the drawings, device 10 includes a first part 18 and a second part 20. The first part 18 is configured to be attached to child seat 12 in a desired location and the second part 20 is configured to be attached to a safety belt of the child seat. The first and second parts 18 and 20 are further configured to be removably connected, via magnetic force, to position the safety belt in a generally open position or a position where a child would not be seated upon the belt when placed into the seat. And then once the child is seated, the first and second parts 18 and 20 can simply be pulled apart by pulling on the belt to which the second part is attached.

As representatively shown, in an embodiment, the first part 18 has a generally disc-shaped body 22 having opposite broad sides 24 and 26. Cover 28 is attached to the body 22 and covers the side 24. In some aspects, cover 28 can be configured to be removably attached to the body 22, for example in a snap-fit-like manner. In further aspects, many covers 28 can be provided, each having a different ornamental design.

As further shown, the first part 18 may have a pin 30 that is attached to the body 22 and that extends outwardly from side 26. The pin 30 facilitates attaching the first part 18 to seat 12 by piercing a seat cover 32 or other fabric material attached to the seat. A safety clasp 34 is removably attached to the pin 30 to secure the first part 18 in place. The first part 18 may further include a magnet 36 that is attached to the body 12 and enclosed by the cover 28.

As further representatively shown, the second part 20 has a strap 38 that is sized and configured to be wrapped around a safety belt 16 (or belts 14a and 14b) of seat 12. As shown, strap 38 can have opposite ends 40 and 42 that are detachably secured together to facilitate wrapping the strap around belt 16 and securing it in place about the belt. The second part 20 further includes an encased ferrous material 44. In embodiments, strap 38 can be made from a material that is not prone to heat absorption to prevent the strap from heating to a temperature that could be uncomfortable to a child or cause injury to the child. In an aspect, strap 38 could be made from a rubber material and the rubber material could encase the ferrous material 44.

In a further aspect, strap 38 can have an integrally formed buckle 46 at end 40 that is configured to be removably engaged with end 42 to facilitate attaching the ends. For example, buckle 46 could have one or more projections 48 that are configured to be frictionally received by corresponding one or more holes 50 formed in end 42.

While the invention has been particularly shown and described with respect to the illustrated embodiment thereof, it will be understood by those skilled in the art that the foregoing and other changes in form and details may be made therein without departing from the spirit and scope of the invention.

For example, other configurations of the second part 20 and its strap 38 are possible without departing from the purposes thereof. Further, while the disclosure discusses the first part 18 having the magnet and the second part 20 having the ferrous material, this arrangement could be swapped. Further yet, a second magnet could be used in place of the ferrous material. Additionally, while the preferred coupling between the first and second parts 18 and 20 is by magnetic force, other coupling methods could be used. For example, hook and loop fasteners could be used to removably couple the first and second parts without departing from the ability to pull the parts apart.

What is claimed is:

1. A safety harness retaining device for a child seat, the device comprising:
   a first part, where the first part has a body, a cover removably attached to the body to cover a first side of the body, a magnet enclosed by the cover and body, a pin attached to and extending from a second side of the body for piercing a covering of the child seat, and a clasp removably connectable to the pin for securing the first part to the covering;
   a second part, where the second part has a strap configured to be wrapped around and secured to a safety harness belt of the child seat, and a ferrous material encased by the strap, wherein the strap includes opposite ends and a length extending between the opposite ends, the opposite ends being releasably connectable to secure the strap about the safety harness belt, and wherein the ferrous material is encased by the strap at a position along the strap length; and
   wherein the first part and the second part are removably connectable through a magnetic force between the magnet and the ferrous material.

2. The safety harness device of claim 1, wherein the body is disc shaped.

3. A safety harness retaining device for a child seat, the device comprising:
   a first part, where the first part has a disc-shaped body, a plurality of covers, one cover thereof at time being removably attached to the body to cover a first side of the body, a magnet enclosed by the cover and body, a pin attached to and extending from a second side of the body for piercing a covering of the child seat, and a clasp removably connectable to the pin for securing the first part to the covering;
   a second part, where the second part has a strap configured to be wrapped around and secured to a safety harness belt of the child seat, and a ferrous material encased by the strap, wherein the strap includes opposite ends and a length extending between the opposite ends, the opposite ends being releasably connectable to secure the strap about the safety harness belt, and wherein the ferrous material is encased by the strap at a position along the strap length;
   wherein at least two or more of the plurality of covers has a different ornamental design; and wherein the first part and the second part are removably connectable through a magnetic force between the magnet and the ferrous material.

* * * * *